// Patented June 12, 1928.

UNITED STATES PATENT OFFICE.

HARUZO NAGASAKI, OF OCHIAI MACHI, JAPAN.

METHOD OF TREATING TEA.

No Drawing. Application filed July 17, 1926, Serial No. 123,251, and in Japan March 10, 1926.

This invention relates to a method of treating tea, which consists in making the pulverized green tea dried at low temperature and dehydrated as well as possible absorb non-drying edible fat or oil.

The object of the invention is to prevent the tea from coming into contact with atmosphere and losing the flavor, dainty color or taste; to make it fit for long preservation and also convenient for handling.

In my invention, dried pulverized green tea is made to absorb the non-drying edible fat or oil refined previously by removing free acid therefrom, such as olive oil, peanut oil, maize oil, tallow, lard, butter, cocoa nut oil, palm seed oil, cocoa butter or hydrogenated oil and then is either allowed to retain its pulverized condition or solidified. This perfectly prevents the tea from coming into contact with atmosphere; losing the flavor and changing the color or taste. It also makes it fit for long preservation and convenient for transportation in package.

The solidified product of this invention makes tea of dainty taste when pulverized or broken into small lumps and stirred up in lukewarm water, or, if desired, may be eaten as it is like cake.

The following is an example of carrying the present invention into practice:—

Dry refined green tea and powder it in a pulverizer without admitting moisture. Then, dehydrate same as well as possible by drying it again at a low temperature under reduced pressure. Treat with alkali solution non-drying edible oil or fat such as olive oil, peanut oil, butter, cocoa nut oil, palm seed oil, cocoa butter or hydrogenated oil to remove free acid therefrom. Dehydrate it, leaving the liquid oil as it is and melting the solid fat with heat, which is then turned into spray with a sprayer and blown on the said dried pulverized tea to make it absorbed by the grains of the tea. Next, it is powdered again or compressed into a form in a mold without being pulverized.

If desired, the tea may be solidified after giving it dark green color by stirring up well the dried pulverized tea in the said oil or melted fat and thus making the tea absorb the oil or fat, or else sugar or the like seasoning powder may be mixed with the raw material.

Claims—

1. A method of treating tea which comprises dehydrating the tea by heating it at a low temperature, then pulverizing the tea, and then impregnating the tea with a non-drying edible dehydrated oil or fat from which has been removed all the free acid.

2. A method of treating tea which comprises dehydrating the tea by heating it at a low temperature and under reduced pressure, then pulverizing the tea, and then spraying on the pulverized tea an edible, dehydrated oil or fat, from which has been removed all the free acid, so as to impregnate the tea therewith.

In testimony whereof I have affixed my signature.

HARUZO NAGASAKI.